United States Patent
Shamine et al.

(10) Patent No.: US 9,595,799 B2
(45) Date of Patent: Mar. 14, 2017

(54) ELECTRICAL ENCLOSURE HAVING A DUAL BUS BAR AND A COMPONENT WITH A DUAL BUS BAR CONNECTOR

(71) Applicant: General Electric Company, Schenectady, NY (US)

(72) Inventors: David Michael Shamine, Holly Springs, NC (US); Ravi Kumar, Andhra Pradesh (IN); Suresh Kasi Venkata Redditha, Andhra Pradesh (IN); Gerald Newman Stevens, II, Ringgold, VA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 233 days.

(21) Appl. No.: 14/208,238

(22) Filed: Mar. 13, 2014

(65) Prior Publication Data
US 2015/0263500 A1    Sep. 17, 2015

(51) Int. Cl.
*H01R 25/16*   (2006.01)
*H02B 11/04*   (2006.01)

(52) U.S. Cl.
CPC ........... *H01R 25/162* (2013.01); *H02B 11/04* (2013.01)

(58) Field of Classification Search
USPC .......................... 174/68.2; 361/608, 663, 660
See application file for complete search history.

(56) References Cited

U.S. PATENT DOCUMENTS

| | | | | |
|---|---|---|---|---|
| 3,346,776 A | * | 10/1967 | Olashaw ................. | H02B 1/36 174/99 B |
| 3,628,098 A | * | 12/1971 | Sturdivan ............... | H02B 1/21 312/257.1 |
| 3,633,075 A | * | 1/1972 | Hawkins ................. | H02B 1/21 337/196 |
| 3,818,281 A | * | 6/1974 | Ferton .................... | H02B 11/04 200/50.26 |
| 6,399,882 B1 | | 6/2002 | Faulkner et al. | |
| 6,420,655 B1 | * | 7/2002 | Yang ...................... | H02B 1/21 174/70 B |

(Continued)

OTHER PUBLICATIONS

GE Electrical Distribution & Control, "Spectra Series and 8000-Line Motor Control Centers", 1997, pp. 1-161.

*Primary Examiner* — Timothy Thompson
*Assistant Examiner* — Krystal Robinson
(74) *Attorney, Agent, or Firm* — GE Global Patent Operation; Stephen G. Midgley

(57) ABSTRACT

An electrical enclosure system includes a housing includes an interior cavity for receiving electrical components. The electrical enclosure system includes at least one dual bus bar arranged in the interior cavity. The at least one dual bus bar includes a first bus bar, and a second bus bar arranged alongside and connected to the first bus bar through an insulated connection. The first bus bar is configured to carry a first electrical current and the second bus bar is configured to carry a second electrical current that is distinct from the first electrical current. An electrical component is arranged in the housing. The electrical component includes a dual bus bar connector operatively connected to and electrically connected to the dual bus bar. The dual bus bar connector includes a first connector portion and a second connector portion electrically isolated from the first connector portion.

12 Claims, 4 Drawing Sheets

(56) References Cited

U.S. PATENT DOCUMENTS

| | | |
|---|---|---|
| 7,417,848 B2 | 8/2008 | Bergmann et al. |
| 7,511,946 B2 | 3/2009 | Malkowski, Jr. et al. |
| 7,719,823 B2 | 5/2010 | Josten et al. |
| 8,420,935 B2 | 4/2013 | Malkowski, Jr. et al. |
| 2005/0277336 A1* | 12/2005 | Yang .................... H01R 13/187 439/636 |
| 2006/0067018 A1 | 3/2006 | Malkowski et al. |
| 2008/0137266 A1 | 6/2008 | Jensen et al. |
| 2011/0110049 A1 | 5/2011 | Lehtola et al. |
| 2013/0077210 A1 | 3/2013 | Morris |

\* cited by examiner

ELECTRICAL ENCLOSURE HAVING A DUAL BUS BAR AND A COMPONENT WITH A DUAL BUS BAR CONNECTOR

BACKGROUND OF THE INVENTION

The subject matter disclosed herein relates to electrical enclosures and, more particularly, to an electrical enclosure having a dual bus bar and a component having a dual bus bar connector.

Electrical enclosures provide a housing for electrical components such as circuit breakers, motor starters, controllers and the like. In general, the electrical enclosure may include a number of busses that provide electrical connections with the electrical component. Each bus provides a specific electrical input. For example, an enclosure may include one or more power busses, a neutral bus, a ground bus, and a control bus. Each bus is separated and insulated from others of the busses to avoid inadvertent electrical contact. Insulation may take the form of insulating members and/or air gaps that may exist between bus bars.

Electrical components generally include connectors that are arranged to connect with each of the busses. The electrical connector typically takes the form of a clamp or stab that receives, and is biased into contact with, a bus. The stab exerts a clamping force on the bus to facilitate a positive and robust electrical connection.

BRIEF DESCRIPTION OF THE INVENTION

According to one aspect of an exemplary embodiment, an electrical enclosure system includes a housing having at least a rear wall and a plurality of side walls extending from the rear wall to form an interior cavity configured to receive electrical components. The electrical enclosure system includes at least one dual bus bar arranged in the interior cavity. The at least one dual bus bar includes a first bus bar, and a second bus bar arranged alongside and connected to the first bus bar through an insulated connection. The first bus bar is configured to carry a first electrical current and the second bus bar is configured to carry a second electrical current that is distinct from the first electrical current. An electrical component is arranged in the housing. The electrical component includes a dual bus bar connector electrically connected to the dual bus bar. The dual bus bar connector includes a first connector portion and a second connector portion operatively connected to and electrically isolated from the first connector portion. The first and second connector portions exert a clamping force on the dual bus bar.

According to another aspect of an exemplary embodiment, a dual bus bar includes a first bus bar, and a second bus bar arranged alongside and connected to the first bus bar through an insulated connection. The first bus bar is configured to carry a first electrical current and the second bus bar is configured to carry a second electrical current that is distinct from the first electrical current.

According to yet another aspect of an exemplary embodiment, a dual bus bar connector for engaging a dual bus bar having a first bust bar arranged alongside and connected to a second bus bar includes a first connector portion, and a second connector portion operatively connected to and electrically isolated from the first connector portion. The first and second connector portions are configured and disposed to exert a clamping force.

These and other advantages and features will become more apparent from the following description taken in conjunction with the drawings.

BRIEF DESCRIPTION OF DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
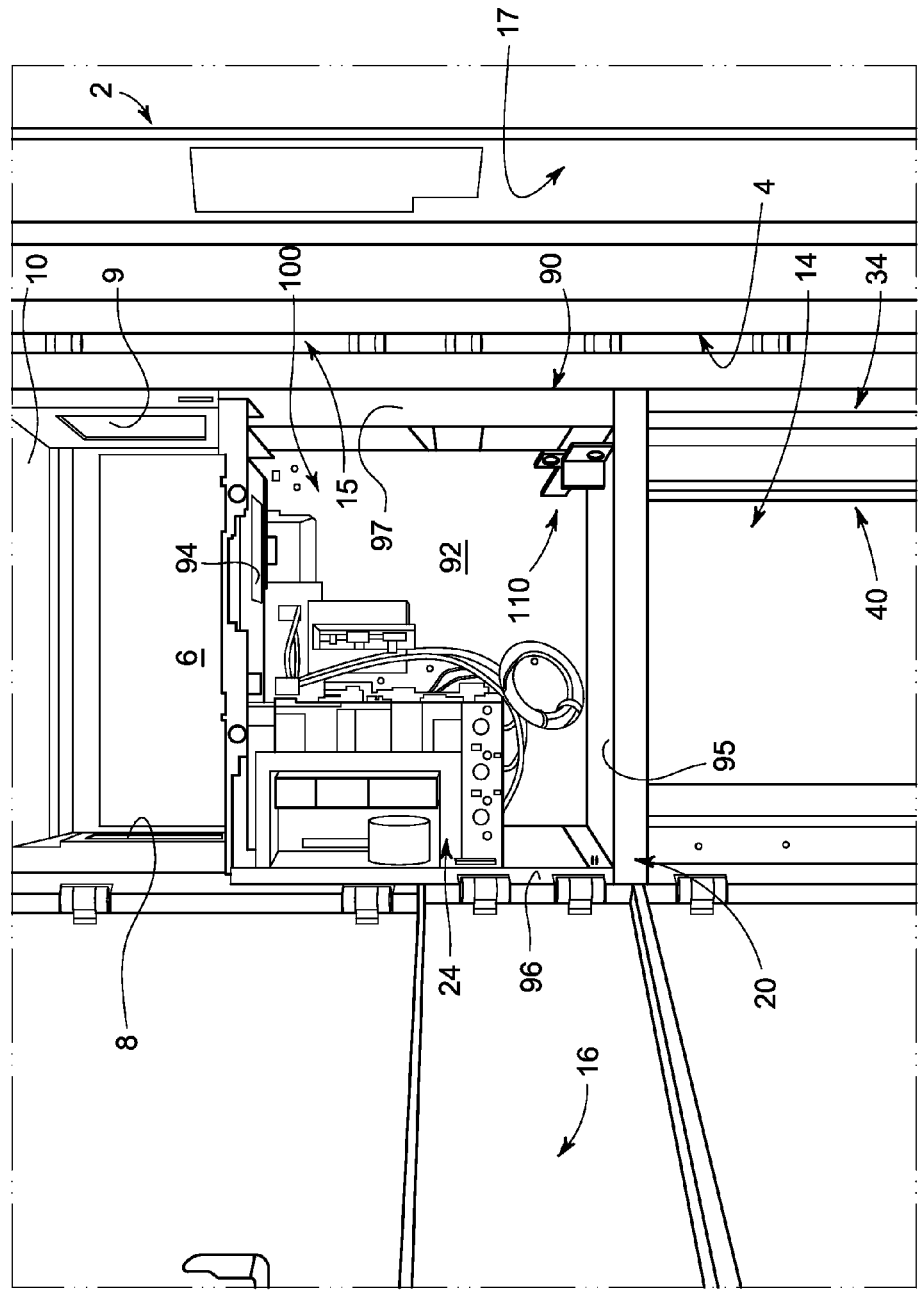
FIG. 1 is a front view of an electrical component having a dual bus bar connector mounted in an electrical enclosure having a dual bus bar, in accordance with an aspect of an exemplary embodiment.

An electrical enclosure system, in accordance with an exemplary embodiment, is indicated generally at 2, in FIG. 1. Electrical enclosure system 2 includes a housing 4. Housing 4 includes a rear wall 6, a first side wall 8 an opposing second side wall 9, a third side wall 10, and an opposing fourth side wall (not shown). Side walls 8-10 and the fourth side wall extend from rear wall 6 to form an interior cavity 14 having an opening 15. A first door 16 is pivotally mounted to first side wan 8 and a second door 17 is pivotally mounted to second side wall 9. First and second doors 16 and 17 are selectively pivoted to close opening 15. An electrical compartment 20 is mounted in housing 4 as will be detailed more fully below. In the example shown, electrical compartment 20 supports a circuit breaker 24 therein. A plurality of power bus bars (not shown) extends vertically through housing 4. In addition, a ground bus bar 34 extends vertically through housing 4 spaced from the power bus bars.

Figure 2:
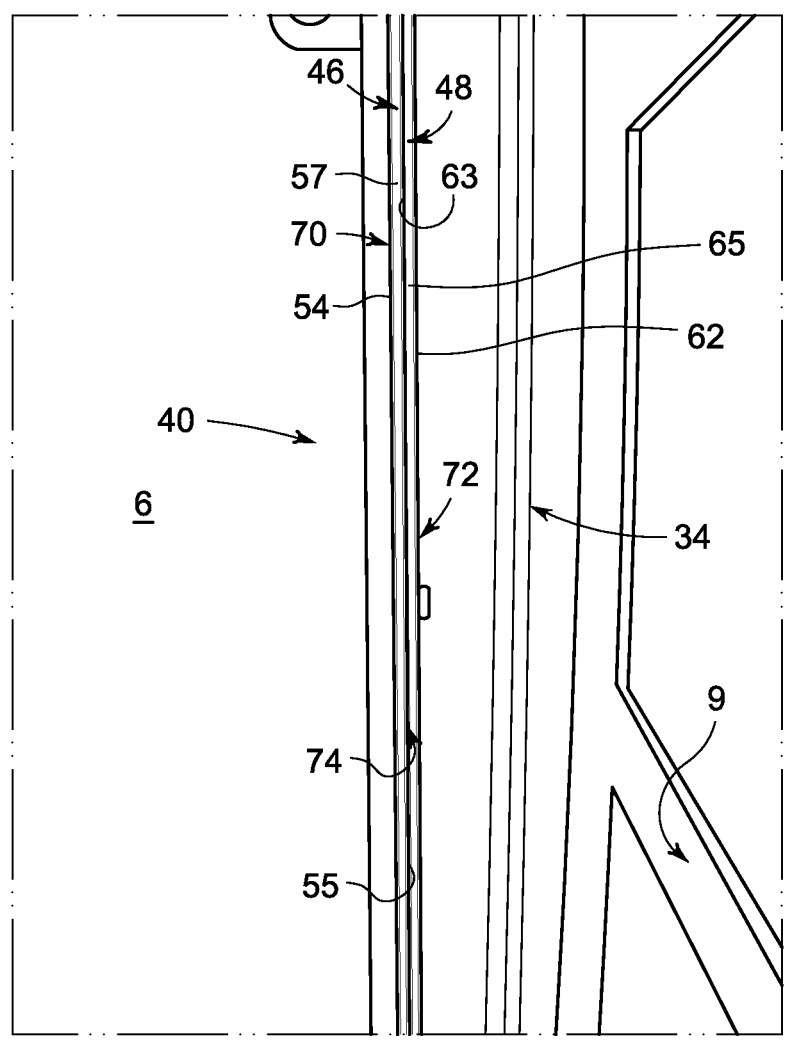
FIG. 2 is a front view of the dual bus bar of FIG. 1.

In accordance with an exemplary embodiment, electrical enclosure system 2 includes a dual bus bar 40 extending through housing 4 adjacent to ground bus bar 34. As best shown in FIG. 2, dual bus bar 40 includes a first bus bar 46 arranged alongside and mechanically connected to and electrically isolated from a second bus bar 48. In accordance with an aspect of the exemplary embodiment, "connected" should be understood to mean that first bus bar 46 is electrically isolated from, yet coupled to, second bus bar 48. The connection may constitute full surface to surface contact or a connection through an intermediate member such as a washer, a spacer or the like. Regardless of the connection, first bus bar 46 remains electrically isolated from second bus bar 48.

First bus bar 46 includes a first, exposed side portion 54, a second side portion 55, an outer edge portion 57 and an inner edge (not shown). Similarly, second bus bar 48 includes a first, exposed side portion 62, a second side portion 63, an outer edge portion 65 and an inner edge (not shown). Second side portion 55 of first bus bar 46 is connected to second side portion 63 of second bus bar 48. The connection does not establish an electrical connection; rather first bus bar 46 is electrically isolated from second bus bar 48. More specifically first bus bar 46 includes a first insulated coating 70 and second bus bar 48 includes a second insulated coating 72 that are joined through second side portions 55 and 63 to establish an insulated connection 74.

Figure 3:
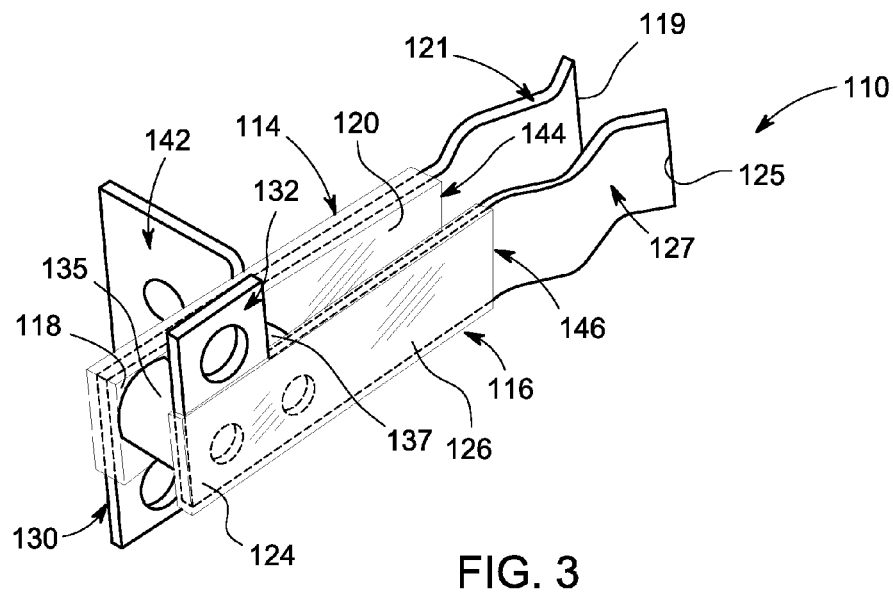
FIG. 3 is a perspective view of the dual bus bar connector, in accordance with an exemplary embodiment.
Figure 4:
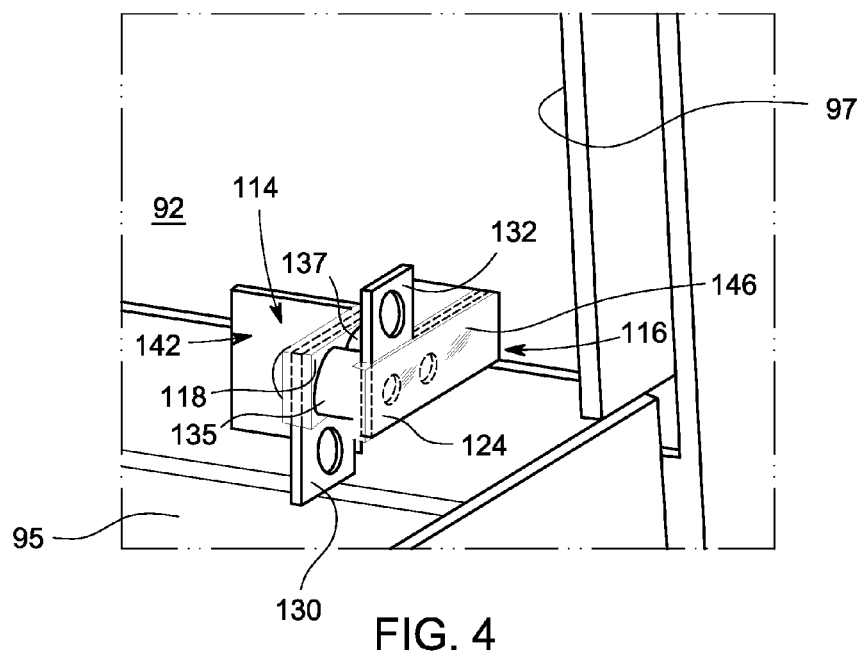
FIG. 4 is a partially cut-away view of the electrical component of FIG. 1 illustrating a portion of the dual bus bar connector of FIG. 3.

In further accordance with an exemplary embodiment, electrical compartment 20 includes a component housing 90 having a rear wall 92, a first side wall 94, an opposing second side wall 95, a third side wall 96 and an opposing fourth side wall 97. Side walls 94-97 extend from rear wall 6 to form an interior 100. Rear wall 92 supports a dual bus bar connector 110 that electrically connects with dual bus bar 40 when electrical compartment 20 is mounted and seated in housing 4. As shown in FIGS. 3 and 4, dual bus bar connector 110 includes a first connector portion 114 and a second connector portion 116.

First connector portion 114 extends from a first end 118 to a second end 119 through an intermediate portion 120 forming a first stab connector portion 121. Similarly, second connector portion 116 extends from a first end 124 to a second end 125 through an intermediate portion 126 forming a second stab connector portion 127. First end 118 of first connector portion 114 includes a first terminal or flag 130 and first end 124 of second connector portion 116 includes a second terminal or flag 132. First flag 130 provides a connection point for a first electrical conductor (not shown) and second flag 132 provides a connection point for a second electrical conductor (also not shown).

In this manner, first connector portion 114 may carry a first electrical signal from first bus bar 46 to a first electrical load (not shown) and second connector portion 116 may carry a second electrical signal from second bus bar 48 to a second electrical load (also not shown) that is distinct from the first electrical load. Further, first end 118 of first connector portion 114 is connected to first end 124 of second connector portion 116 through a pair of insulators 135 and 137. When connected, first stab connector portion 121 and second stab connector portion 127 are biased toward one another forming a stab connector 140 that clampingly engages dual bus bar 40 as will be detailed below. In addition, a mounting member 142 is mounted to first connector portion 114. Mounting member 142 supports dual bus bar connector 110 on rear wall 92 of component housing 90. First connector portion 114 is also shown to include a first insulated covering 144 that extends from first end 118 toward second end 119 and second insulated covering 146 that extends from first end 124 toward second end 125. Insulated coverings 144 and 146 provide an electrical barrier between dual bus bar connector 110 and component housing 90.

Figure 5:
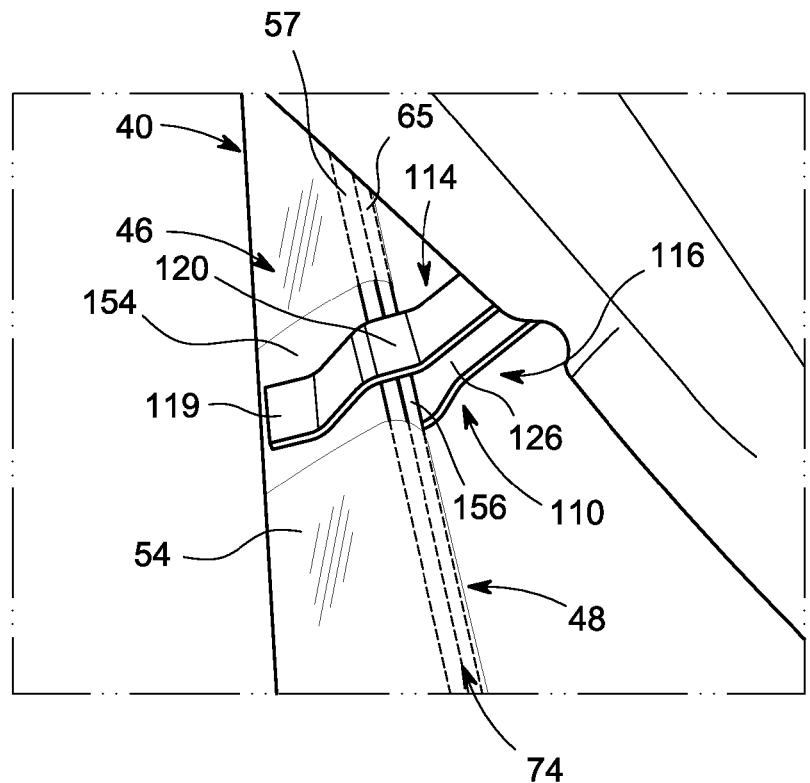
FIG. 5 is a lower view of the dual bus bar connector engaging the dual bus bar, in accordance with an aspect of an exemplary embodiment.

In further accordance with an exemplary embodiment, component housing 90 is installed into housing 4. Component housing 90 is shifted upon rails (not shown) until dual bus bar connector 110 electrically connects with dual bus bar 40, as shown in FIG. 5. Additional bus bar connectors or stabs connect with the power bus bars and the ground bus bar. A first void region 154 is formed in first insulating covering 70 of first bus bar 46. A second void region 156 is formed in second insulating covering 72 on second bus bar 48. First void region 154 exposes a section of first bus bar 46 to second end 119 of first connector portion 114. Similarly, second void region 156 exposes a portion of second bus bar 48 to second end 125 of second connector portion 116. Therefore, first and second void regions 154 and 156 are axially aligned along dual bus bar 40. Further, it should be understood that additional void regions (not shown) may be arranged at predetermined axial positions along dual bus bar 40 to facilitate additional electrical connections.

Figure 6:
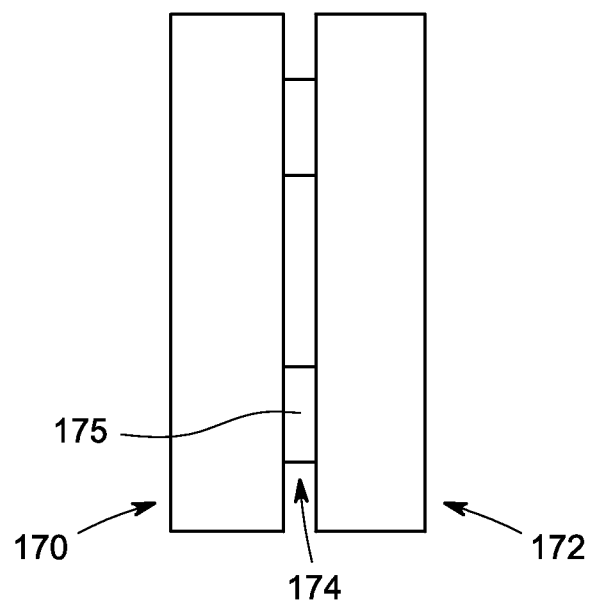
FIG. 6 is a detailed view of the dual bus bar, in accordance with an aspect of an exemplary embodiment.

At this point it should be understood that the exemplary embodiments describe a dual bus bar formed by joining to individual bus bars along a surface. A dual bus bar connector engages the dual bus bar to conduct electrical current from each bus bar to a load. For example, the dual bus bar may conduct a neutral signal and a control signal to a circuit interrupter or motor controller. Also, while shown connected to a single electrical component, it should be understood that the number of electrical components connected to the dual bus bar may vary. Also, it should be understood that the dual bus bar may include first and second bus bars 170 and 172 spaced from one another by a gap 174, such as shown in FIG. 6. An insulator 175 directly connects first bus bar 170 to second bus bar 172. In this case, the term "directly connected" should be understood to mean first and second bus bars directly connected to opposing surfaces of an insulator.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An electrical enclosure system including a housing having at least a rear wall and a plurality of side walls extending from the rear wall to form an interior cavity configured to receive electrical components, the electrical enclosure system comprising:
    at least one dual bus bar including a first bus bar, and a second bus bar arranged alongside and connected to the first bus bar through an insulated connection, the first bus bar being configured to carry a first electrical current and the second bus bar being configured to carry a second electrical current that is distinct from the first electrical current; and
    an electrical compartment arranged in the housing, and selectively shiftable between a first connected position and a second disconnected position, the electrical compartment including a dual bus bar connector electrically connected to the dual bus bar when in the first connected position, the dual bus bar connector including a first connector portion and a second connector portion operatively connected to and electrically isolated from the first connector portion, the first and second connector portions exerting a clamping force on the dual bus bar when in the first connected position;
    wherein the dual buabar is arranged within the interior cavity and disposed external to the electrical compartment.

2. The electrical enclosure system according to claim 1, wherein the first connector portion forms a first stab connector portion and the second connector portion forms a second stab connector portion, the first and second stab connector portions forming a single stab connector electrically connected to the at least one dual bus bar.

3. The electrical enclosure system according to claim 2, wherein the first and second connector portions further comprise respective end portions including respective terminals arranged to provide a connection point for respective electrical conductors.

4. The electrical enclosure system according to claim 3, wherein the respective end portions of the first and second connector portions are disposed within the interior cavity, and the respective stab portions of the first and second connector portions are disposed to protrude therefrom.

5. The electrical enclosure system according to claim 3, wherein the the dual bus bar connector further comprises a mounting member coupled to the electrical compartment.

6. The electrical enclosure system according to claim 1, wherein the insulated connection includes an insulated coating disposed on the surface of at least one of the first and second bus bars.

7. The electrical enclosure system according to claim 6, wherein the insulated coating includes a void region at a predetermined axial position on the first and second bus bars, the void region exposing a portion of the at least one first and second bus bars.

8. The electrical enclosure system according to claim 7, wherein each of the first and second bus bars includes a side portion and an edge portion, the void region extends from the side portion to the edge portion.

9. The electrical enclosure system according to claim 1, wherein the insulated connection is an insulator joining the first bus bar directly to the second bus bar.

10. The electrical enclosure system according to claim 6, wherein the insulated connection includes a first insulated coating disposed on the first bus bar and a second insulated coating disposed the second bus bar.

11. The electrical enclosure system according to claim 10, wherein the first insulated, covering includes a first void region at a predetermined axial position on the first bus bar and the second insulated covering includes a second void region on the second bus bar, the first void region exposing a portion of the first bus bar and the second void region exposing a portion of the second bus bar.

12. The electrical enclosure system according to claim 11, wherein the first void region is axially aligned with the second void region.

* * * * *